United States Patent [19]

Tutewohl

[11] Patent Number: 5,725,727
[45] Date of Patent: Mar. 10, 1998

[54] COMBINATION LAMINATING TOOL

[76] Inventor: Joseph P. Tutewohl, 71 Reid Ave., Rockville Centre, N.Y. 11570

[21] Appl. No.: 600,534

[22] Filed: Feb. 13, 1996

[51] Int. Cl.$^6$ .............................. B44C 7/02; B25G 3/00
[52] U.S. Cl. .............................. 156/579; 81/488
[58] Field of Search .............................. 156/573, 574, 156/579; 81/488; 15/105, 246.2; D8/45, 70.1, 105, 107; D32/40, 42, 46, 48, 49; 492/13; 403/108

[56] References Cited

U.S. PATENT DOCUMENTS

| | | | |
|---|---|---|---|
| D. 196,709 | 10/1963 | Johnson | D32/48 |
| D. 219,303 | 11/1970 | Golden | D32/49 |
| 775,089 | 11/1904 | McClenahan | 492/13 |
| 3,164,351 | 1/1965 | Rembowski | 403/108 |
| 3,815,447 | 6/1974 | Sterling | 81/488 |
| 4,034,595 | 7/1977 | Smith | 81/488 |
| 4,786,095 | 11/1988 | Dumont | 294/51 |
| 4,910,821 | 3/1990 | Kieferle | 81/488 |
| 5,239,725 | 8/1993 | White | 15/105 |
| 5,242,362 | 9/1993 | Talamantez | 492/13 |

FOREIGN PATENT DOCUMENTS 183944  8/1922  United Kingdom .

OTHER PUBLICATIONS

Catalog of Hyde Decorating Aids and Paint-Up Tools, 1971, pp. 2, 3, 5 and 8.

*Primary Examiner*—Richard Crispino
*Attorney, Agent, or Firm*—Galgano & Burke

[57] ABSTRACT

A three-in-one combination laminating tool configured in form of an elongate handle having a first end and an opposite second end, a freely-rotatable roller supported at the first end of the handle, and a relatively narrow blade-like laminate edge presser supported at the opposite second end of the handle. The first end of the handle comprises a generally U-shaped yoke having a pair of spaced-apart arms for rotatably supporting the roller therebetween. The tool allows carpenters, cabinetmakers, and other users the convenience of one hand operation in applying pressure to the entire surface of a plastic laminate or wood veneer. Specifically, an evenly distributed pressure is applied via the relatively large roller to the large easily accessible surface areas of the laminate, and via the narrow blade-like laminate edge presser to those typically inaccessible surface areas of the laminate, such as corners, edges or butt joints. Preferably, the tool further includes a relatively broad blade-like veneer presser, releasably mountable to the second end of the handle, for applying pressure to delicate and thin wood veneers.

19 Claims, 2 Drawing Sheets

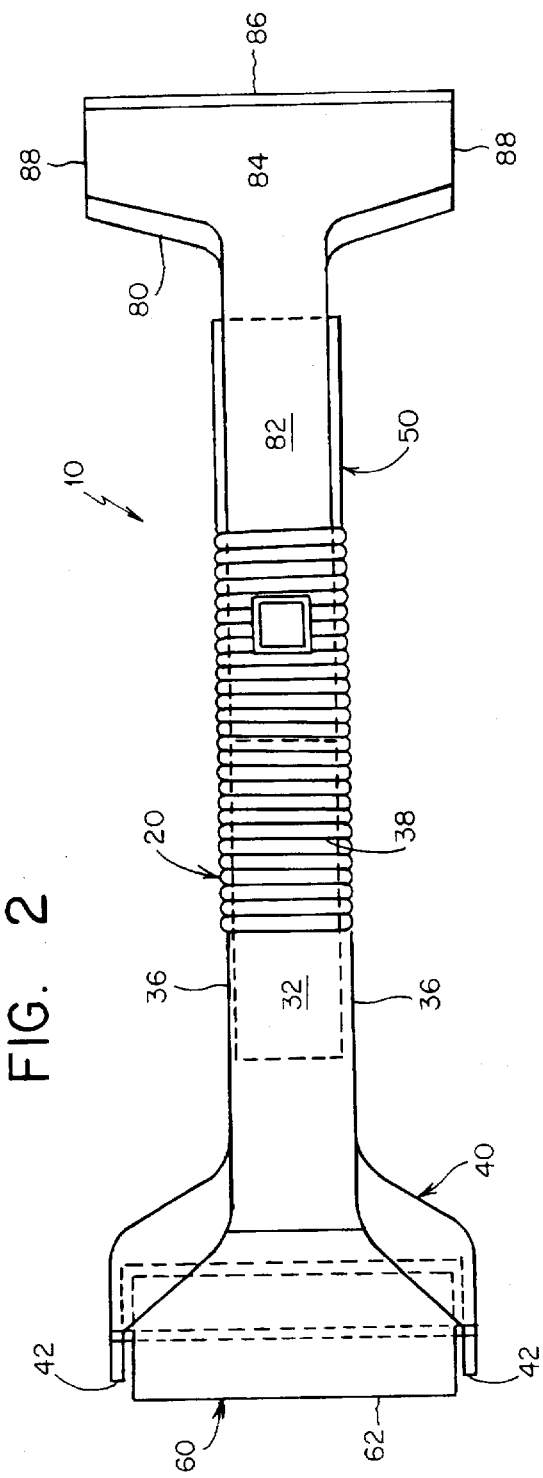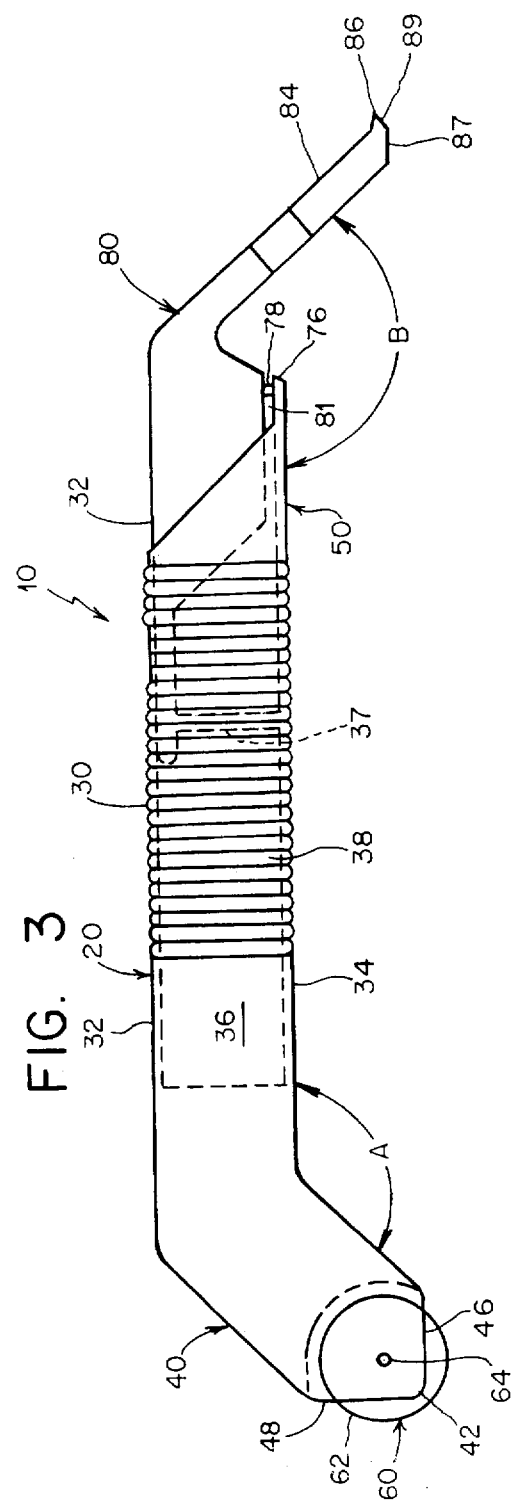

COMBINATION LAMINATING TOOL

BACKGROUND OF THE INVENTION

The present invention relates generally to hand held laminating tools for use in applying pressure to surfaces. More particularly, this invention relates to a hand held, three-in-one combination laminating tool having a surface roller, a laminate edge presser and a veneer presser for use in applying pressure to the surface of either plastic laminates or wood veneers during bonding thereof to a suitable substrate.

Plastic laminates such as Formica® are typically bonded to a substrate such as wood in the fabrication of countertops, table tops, doors and cabinets. The bonding process generally includes applying a layer of adhesive to the rear side of the laminate and/or applying a layer of adhesive to the substrate, and subsequently contacting and adhesively bonding the laminate and substrate together. Importantly, after contacting and bonding the laminate and substrate together, pressure is applied to the top surface of the laminate in order to form a secure adhesive bond between the laminate and the substrate. The application of pressure between the laminate and the substrate insures that the adhesive layer more completely and uniformly contacts and bonds with the laminate and substrate, as well as, aid in removing any air bubbles therebetween.

The most commonly used tools for applying pressure to a laminate surface during the bonding thereof to a suitable substrate, are configured similar to paint rollers. Specifically, such tools include a straight handle attached via a generally L-shaped arm to a freely rotatable roller having an axis disposed normally to the handle. One drawback with this type of tool is the difficulty in transferring forces from the straight handle through the roller to the laminate surface. Another with this type of tool is the difficulty in applying an evenly distributed and high pressure to the laminate surface due to the general cantilever support of the roller by the handle. A further drawback of this type of roller is the inability to apply pressure to relatively small and tight surface areas where the roller cannot reach, such as corners, edges or butt joints. Similarly configured rollers include U.S. Pat. No. 3,540,104 to Duffy for a wall paper seam roller, and U.S. Pat. No. 5,242,362 to Talamantez for a lightweight floor covering roller.

Another example, U.S. Pat. No. 5,068,951 to Abrams, discloses a device for applying a constant pressure to a surface. The device includes a cylinder, a first wheel and a second wheel coupled to each end, respectively, of the cylinder, and an elastomeric covering which surrounds the cylinder. The elastomeric covering extends a greater distance than the diameter of the wheels and a straight wire-like handle attaches to both sides of the wheels. A drawback with this device is the difficulty in transferring large forces from the straight handle through the roller to the laminate surface. Another drawback with this device is the inability to apply pressure to the relatively small and tight surface areas due to the wheels and portions of the handle extending from the ends of the elastomeric covering which contacts the surface.

Another roller design for applying pressure to a laminate during the bonding thereof to a suitable substrate is shown in U.S. Pat. No. 5 069 732 granted to Levine. Levine discloses a hard-rubber roller rotatably mounted within and extending beyond one corner of a pressure block. In Levine, a heel of a user's palm is placed on top of the corner adjacent the roller and the fingers grip the opposite corner of the block. A drawback with this type of roller is the inability to apply pressure to relatively small and tight surface areas due to a user's fingers or thumb contacting adjacent structure so as to limit access of the roller to corners, edges and butt joints.

While the prior art is generally acceptable for its intended use, so far as known, there are no known prior art laminating tools which combine a roller for applying pressure to easily accessible surface areas of a laminate during the bonding thereof to a suitable substrate, and a narrow blade-like laminate edge presser which allows applying pressure to those typically inaccessible areas of the laminate, e.g., edges, corners and butt joints. Furthermore, so far as known there is no presently available three-in-one laminating tool which combines a roller, a narrow blade-like laminate edge presser, and a broad blade-like veneer presser, for use in applying pressure to a laminate or veneer, respectively, during the bonding thereof to a suitable substrate.

SUMMARY OF THE INVENTION

Accordingly, it is an object of the present invention to provide a novel combination laminating tool which is conveniently held with one hand so that a user can easily alternate between use of a freely-rotatable roller and relatively narrow blade-like laminate edge presser for applying pressure to essentially the entire surface of a laminate such as Formica® during the bonding thereof to suitable substrate.

It is another object of the present invention to provide a combination laminating tool having a freely-rotatable roller supported by the arms of a U-shaped yoke member attached to one end of an elongate handle which allows a user to quickly apply an evenly distributed high pressure to those large easily accessible surface areas of a laminate during the bonding thereof to a suitable substrate.

It is also an object of the present invention to provide a combination laminating tool having a relatively narrow blade-like laminate edge presser attached to the opposite end of an elongate handle which allows a user to quickly apply pressure to typically inaccessible laminate surface areas, e.g., edges, corners and butt joints.

It is still another object of the present invention is to provide a combination laminating tool which includes a relatively broad blade-like veneer presser for applying the appropriate pressure to delicate and relatively thin and easily damaged veneers.

It is a further object of the present invention is to provide such a novel combination laminating tool which may be manufactured relatively easily and inexpensively for widespread sale and use by carpenters, cabinetmakers and others.

Certain of the foregoing and related objects are readily obtained in a combination laminating tool which comprises an elongated handle having a first end and an opposite second end, a freely-rotatable roller supported at the first end of the handle, and a relatively narrow blade-like laminate edge presser supported at the opposite second end of the handle. Preferably, a generally U-shaped yoke is joined to the first end of the roller and the yoke includes a pair of spaced-apart arms for rotatably supporting the roller therebetween.

In a preferred embodiment of the present invention, the laminating tool further comprises a relatively broad blade-like veneer presser which is desirably releasably attachable to the handle. Specifically, the veneer presser has a generally T-shaped profile and includes an arm and an enlarged outwardly flared broad blade secured to the arm. The arm has an inner end which is releasably and telescopically received within the opposite second end of the handle, and an opposite outer end which attached to the blade. Desirably, the tool further comprises releasable locking means for releasably locking the veneer presser on the handle. The releasable locking means comprises an outwardly biased button disposed on the arm of the veneer presser so that the button is receivable in a snap-fit manner in a corresponding button opening in the handle.

Preferably, the blade of the veneer presser and the handle are disposed at an angle of about 120 degrees to about 150 degrees therebetween when attached to each other, and desirably at an angle of about 135 degrees therebetween. The blade of the veneer presser includes an edge having a lower face and a chamfered face. Desirably, the handle, the laminate edge presser and the veneer presser are fabricated from non-scratch materials.

The handle of the tool is generally rectangular and comprises a top wall, a bottom wall and opposite side walls, and includes a generally centrally disposed knurled portion to enhance hand gripping of the handle. Preferably, the yoke and the handle are disposed at an angle of about 120 degrees to about 150 degrees therebetween, and desirably, at an angle of about 135 degrees therebetween.

The laminate edge presser of the tool generally comprises a planar blade with a relatively flat edge. Preferably, the blade of the laminate edge presser has a width substantially equal to the width of the handle, and desirably the flat edge includes a chamfered face.

BRIEF DESCRIPTION OF THE DRAWINGS

Other objects and features of the present invention will become apparent from the detailed description considered in connection with the accompanying drawings, which disclose a preferred embodiment of the invention. It is to be understood that the drawings are to be used for the purpose of illustration only and not as a definition of the limits of the invention.

In the drawings, wherein similar reference characters denote similar elements throughout the several views:

FIG. 2 is a plan view of the tool shown in FIG. 1, with portions broken away to show internal construction; and FIG. 3 is a side elevational view of the tool shown in FIG. 1.

DETAILED DESCRIPTION OF THE PREFERRED AND ILLUSTRATED EMBODIMENT

Figure 1:
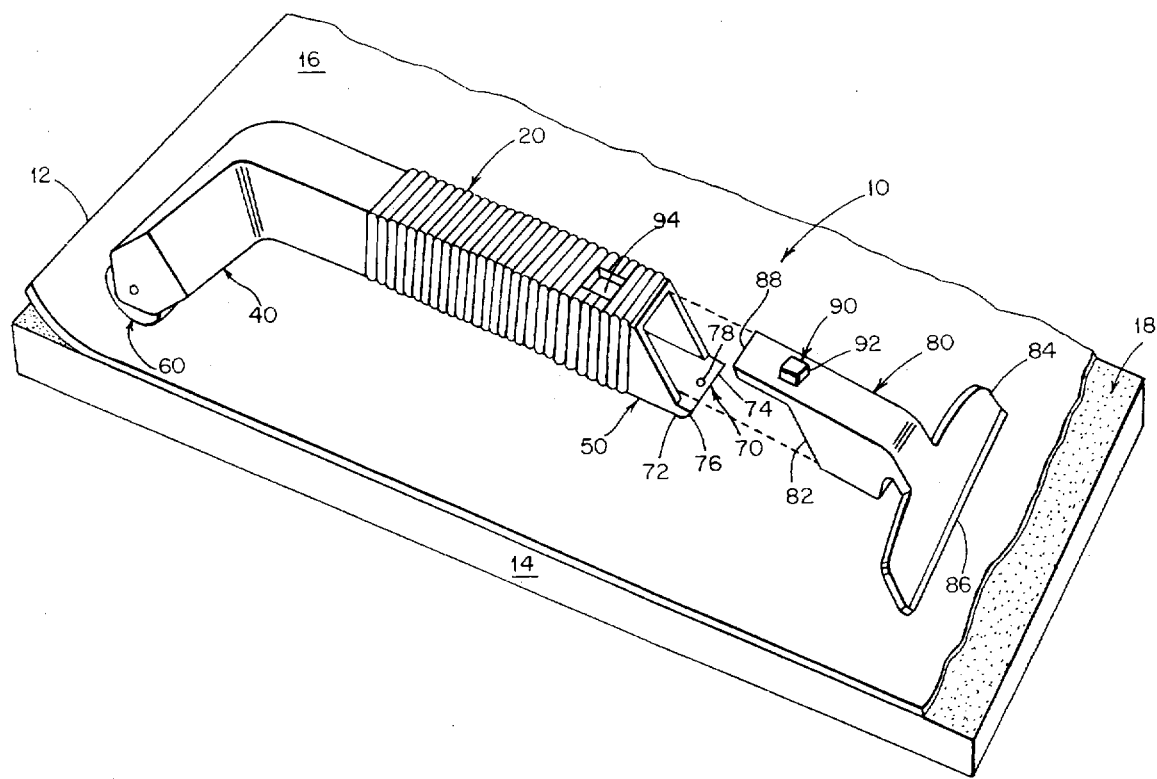
FIG. 1 is an exploded perspective view of a combination laminating tool embodying the present invention showing the same in use on a web of laminate being bonded to a substrate.

Turning now to the drawings, and in particular FIG. 1 thereof, therein illustrated is a novel three-in-one combination laminating tool 10 embodying the present invention for applying pressure to a top surface 16 of a laminate or veneer 12 during bonding thereof, using an adhesive 18, to a suitable substrate 14. Tool 10 includes an elongate generally rectangular shaft or handle 20 which has an enlarged, generally U-shaped yoke 40 disposed at one end thereof which supports a freely-rotatable roller 60 therebetween. A relatively narrow blade-like laminate edge presser 70 is supported at an opposite second end 50 of handle 20 thereof, and a relatively broad blade-like veneer presser 80 is telescopically mounted in a hollow recess in the opposite second end 50 of handle 20.

Tool 10 allows carpenters, cabinetmakers, and other users, the convenience of one hand operation in applying pressure to laminates via a relatively large roller 60, and those surface areas of a laminate inaccessible with roller 60, via a relatively narrow blade-like laminate edge presser 70 disposed at the opposite end of handle 20. Tool 10 eliminates having to switch back and forth between two or more separate tools for applying pressure to the entire surface of a laminate during the bonding thereof to a suitable substrate. Furthermore, relatively broad blade-like veneer presser 80 allows users the convenience of applying an appropriate evenly distributed pressure to relatively delicate veneers during the bonding thereof to a suitable substrate.

With reference to FIGS. 2 and 3, handle 20 includes a top wall 32, a bottom wall 34 and opposite side walls 36. Handle 20 is generally hollow and includes a reinforcing cross-rib 37 (shown in dashed lines). Preferably, handle 20 is rectangular in cross-section, and desirably is one and one-quarter inch square. It is appreciated that the handle can have any suitable cross-section, e.g., circular, rectangular or combinations thereof. Advantageously, handle 20 includes an outer centrally disposed surrounding knurled portion 38 which aids in the ability of a user to grasp and hold handle 20 while using tool 10. It is further appreciated that the handle can be essentially solid except for an end which attaches to a veneer presser as described in greater detail below.

Yoke 40 terminates in two spaced-apart outwardly flared yoke support arms 42 which receive and support opposite ends of a shaft 64 of freely-rotatable roller 60. As seen best in FIG. 3, roller 60 is dimensioned such that its roller surface 62 projects beyond arms 42, i.e., a lower edge 46 and front edge 48 of support arms 42 are disposed inwardly of roller surface 62 so that arms 42 do not contact the laminate surface during use. As best shown in FIG. 3, yoke 40 and handle 20 are preferably disposed at an angle A therebetween in the range of about 90 degrees to about 150 degrees. Most desirably, yoke 40 and handle 20 are disposed at an angle A of about 135 degrees therebetween. Although yoke 40 is shown as being solid, it is appreciated that a yoke can be partially or substantially hollow.

In contrast to a conventional laminating tool having a straight handle attached via an L-shaped arm to a roller, the angled configuration between yoke 40 and handle 20 provides a more efficient transfer of downwardly directed forces from handle 20 to the surface of a laminate particularly when handle 20 is held and operated horizontally. In addition, yoke 40 extends downwardly a sufficient distance so that a user's fingers are conveniently and safely disposed and accommodated along bottom surface 34 so as to not contact or rub against the top surface of a laminate during use.

Referring again to FIG. 1, laminate edge presser 70 comprises a generally horizontally disposed planar blade 72 having a flat edge 74. Preferably, the width of laminate edge presser 70 is equal to the width of handle 20, although it is appreciated that the width of blade 72 can be sized smaller than or wider than the width of handle 20. Desirably, blade 72 is integral with and serves as an extension of bottom wall 34 of handle 20. Flat edge 74 is used to apply pressure to those typically inaccessible areas, such as corners, edges and butt joints, during the bonding of a laminate to a suitable substrate, and preferably, flat edge 74 includes a chamfered face 76.

Veneer presser 80 has a generally T-shaped profile and includes an arm 82, the inner end of which is releasably and telescopically received within the second opposite and below end 50 of handle 20. The opposite outer end of arm 82 is attached to an enlarged, outwardly flared and downwardly angled broad blade 84 having a flat edge 86. The inner end of arm 82 includes a resilient finger 88 which when inserted within opposite second end 50 of handle 20 is received between cross rib 39 and upper wall 32 (FIG. 3). A bottom wall 81 of arm 82 is supported a detent or raised pin 78 of laminate edge presser 70 to provide a tighter or friction fit. As best seen in FIG. 3, flat edge 86 is configured to have a generally flattened foot-shape configuration. Specifically, flat edge 86 includes a lower face 87 and a chamfered face 89. When veneer presser 80 is attached to handle 20, blade 84 and handle 20 are disposed at an angle B preferably between about 90 degrees to about 150 degrees therebetween. Most desirably, blade 84 and handle 20 are disposed at an angle B of about 135 degrees therebetween.

As shown in FIG. 1, arm 82 further comprises a releasable locking means 90 for releasably mounting veneer presser 80 in handle 20. Releasable locking means 90 comprises a normally outwardly and upwardly biased button 92 mounted on top of finger 88 which is receivable in a snap-fit manner in a corresponding button opening 94 in handle 20. To disconnect veneer presser 80 from handle 20, button 92 is pressed downwardly and released from opening 94 thereby allowing veneer presser 80 to be telescopically withdrawn or pulled out and away from handle 20.

In contrast to the relatively narrow blade-like laminate edge presser 70, the relatively broad blade-like veneer presser 80 provides a more evenly distributed downwardly directed forces from handle 20 to the surface of delicate veneers. In addition, similar to arms 42 of yoke 40, blade 84 of veneer presser 80 extends a sufficient distance below bottom wall 34 of handle 20 so that the fingers of a user's hand do not contact or scrape against the top surface of a veneer during use of the tool.

Roller 60 is preferably constructed of a durable, non-scratch material such as a polyurethane and axle 64 is preferably a cylindrical steel rod. Advantageously, handle 20, laminate edge presser 70 and veneer presser 80 are fabricated out of a non-scratch, preferably plastic material. It is appreciated that the veneer presser and laminate edge presser can be fabricated from the same non-scratch material, or the laminate edge presser and the veneer presser can be fabricated from different materials or different density materials so as to have a different stiffness, rigidity or resiliency to accommodate particular applications of the tool.

Thus, while only one embodiment of the present invention have been shown and described, it is appreciated that many changes and modification may be made thereunto without departing from the spirit and scope of the invention.

What is claimed is:

1. A combination laminating tool, comprising:
   an elongated handle having a first end and an opposite second end;
   a freely-rotatable roller supported at said first end of said handle;
   a generally planar laminate edge presser comprising a planar blade supported by and extending from said opposite second end of said handle;
   a detachable generally planar veneer presser; and
   means for releasably attaching said veneer presser to said opposite second end of said handle.

2. A tool according to claim 1, wherein said first end comprises a generally U-shaped yoke joined to said first end of said handle, said yoke including a pair of spaced-apart arms for rotatably supporting said roller therebetween.

3. A tool according to claim 2, wherein said yoke and said handle are disposed at an angle of about 120 degrees to about 150 degrees therebetween.

4. A tool according to claim 3, wherein said yoke and said handle are disposed at an angle of about 135 degrees therebetween.

5. A tool according to claim 1, wherein said roller is wider than said laminate edge presser, and said veneer presser is wider than said laminate edge presser.

6. A tool according to claim 1, wherein said releasably attaching means comprises said second end of said handle having a hollow recess and said veneer presser comprises an arm and an enlarged outwardly flared broad blade secured to said arm, said arm being releasably and telescopically an receivable in said recess.

7. A tool according to claim 6, further comprising releasable locking means for releasably locking said veneer presser to said handle.

8. A tool according to claim 7, wherein said releasable locking means comprises an outwardly biased button disposed on said arm of said veneer presser, said button being receivable in a snap-fit manner in a corresponding button opening in said handle.

9. A tool according to claim 6, wherein said blade said veneer presser and said handle are disposed at an angle of about 120 degrees to about 150 degrees therebetween when attached to each other.

10. A tool according to claim 9, wherein said blade of said veneer presser and said handle are disposed at an angle of about 135 degrees therebetween.

11. A tool according to claim 6, wherein said blade of said veneer presser has a flat edge comprising a lower face and a chamfered face.

12. A tool according to claim 1, wherein said handle, laminate edge presser and said veneer presser are fabricated from non-scratch plastic materials.

13. A tool according to claim 1, wherein said handle is generally rectangular and comprises a top wall, a bottom wall and opposite side walls.

14. A tool according to claim 1, wherein said handle has a generally centrally disposed knurled portion to enhance hand gripping of said handle.

15. A tool according to claim 1, wherein said laminate edge presser further comprises a relatively flat edge.

16. A tool according to claim 1, wherein said blade of said laminate edge presser has a width substantially equal to the width of said handle.

17. A tool according to claim 1, wherein said flat edge of said laminate edge presser includes a chamfered face.

18. A combination laminating tool for applying pressure to a surface, corners, and butt joints of a laminate during bonding to a substrate, said tool comprising:
   a generally horizontal elongated handle having a first end and a second end;
   a broad, freely-rotatable roller supported by laterally extending spaced-apart arms joined to and downwardly depending from said first end of said handle;
   a narrow, planar laminate edge presser supported by and extending from said second end of said handle, said planar laminate edge presser having a top surface, a bottom surface, and a chamfer between said top surface and said bottom surface to define a generally flat rectangular-shaped elongated surface for applying pressure when said first end of said handle is angled above said second end, said elongated surface being fabricated from plastic; and
   means for additionally attaching a veneer presser to said second end of said handle; wherein
   said broad roller allows applying pressure to large easily accessible surfaces and said narrow laminate edge presser allows applying pressure to corner and butt joint surfaces.

19. A tool according to claim 18, wherein said laminate edge presser has a width substantially equal to the width of said handle.

* * * * *